Jan. 8, 1929.                                                      1,698,229
F. A. HAYES
VARIABLE SPEED TRANSMISSION MECHANISM
Filed June 29, 1925               5 Sheets-Sheet 1
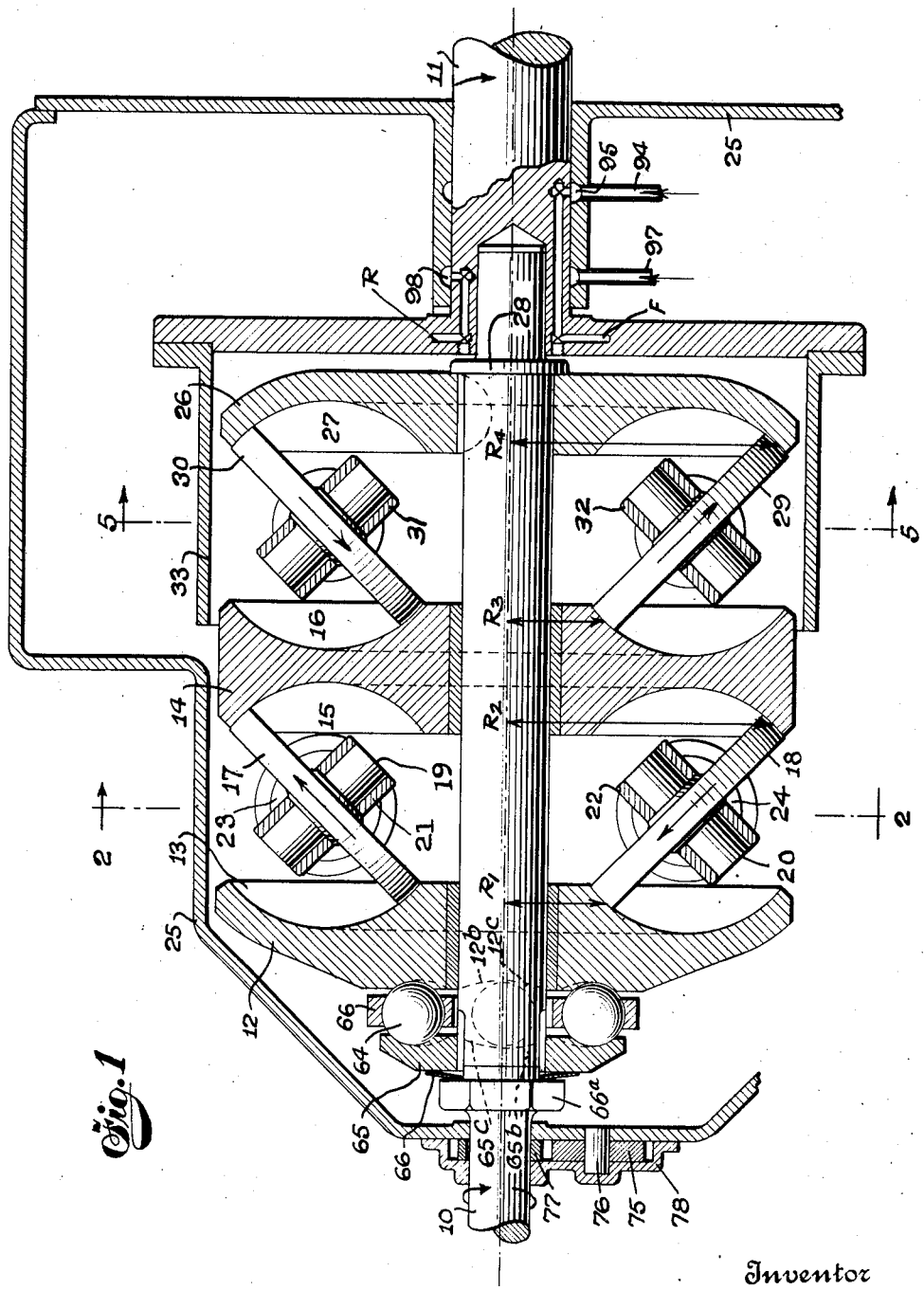
Inventor
Frank A. Hayes.
By his Attorneys
Cooper, Kerr & Dunham Jan. 8, 1929.
F. A. HAYES
1,698,229
VARIABLE SPEED TRANSMISSION MECHANISM
Filed June 29, 1925      5 Sheets-Sheet 2
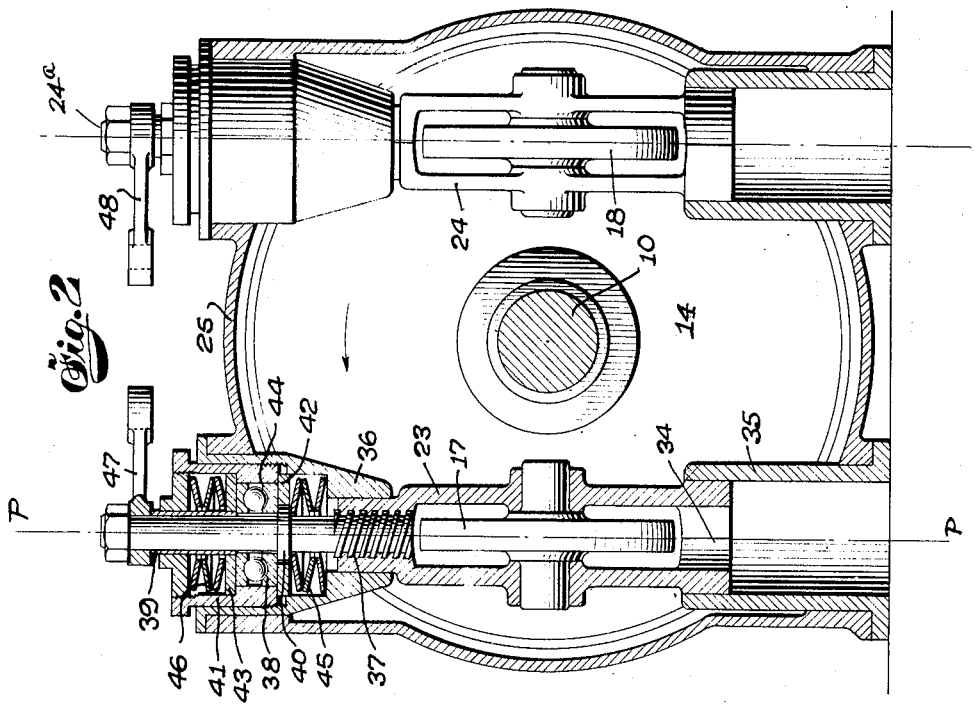
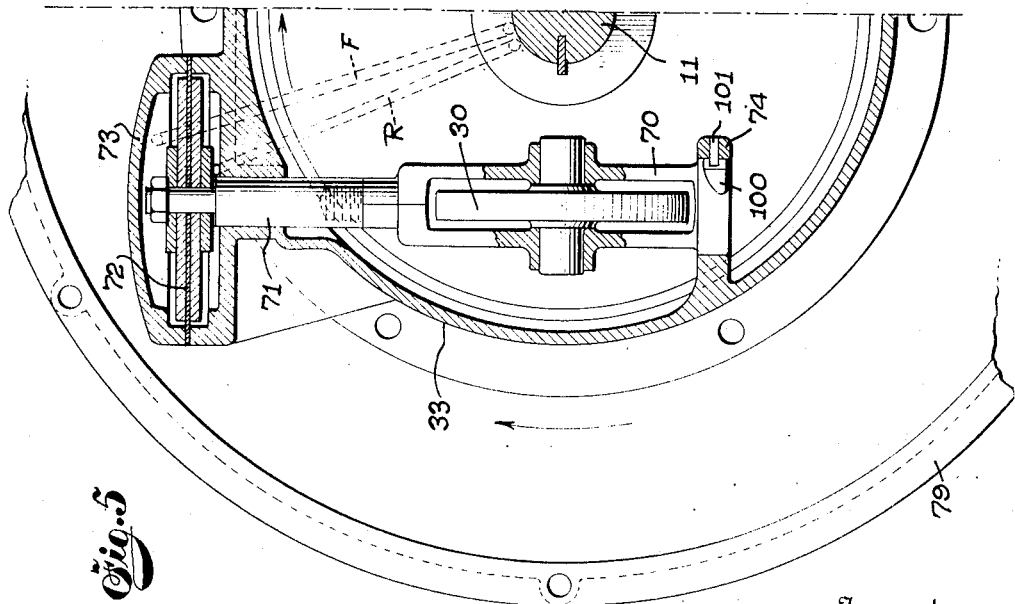
Inventor
Frank A. Hayes.
By his Attorneys
Cooper, Kerr & Dunham

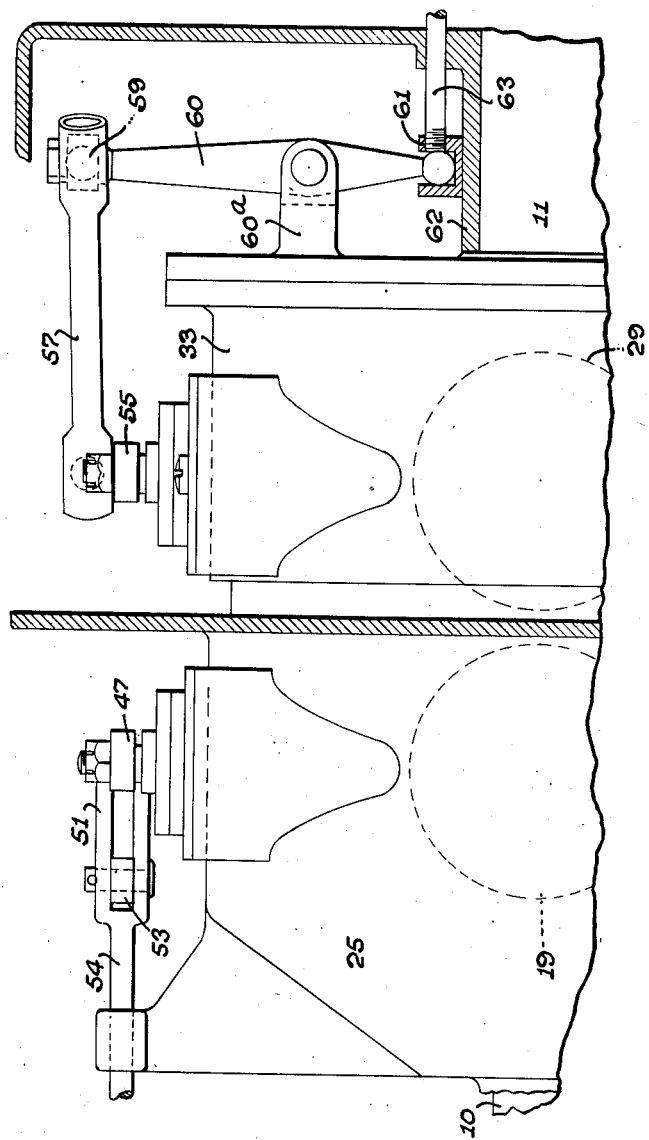

Jan. 8, 1929.
F. A. HAYES
1,698,229
VARIABLE SPEED TRANSMISSION MECHANISM
Filed June 29, 1925   5 Sheets-Sheet 4
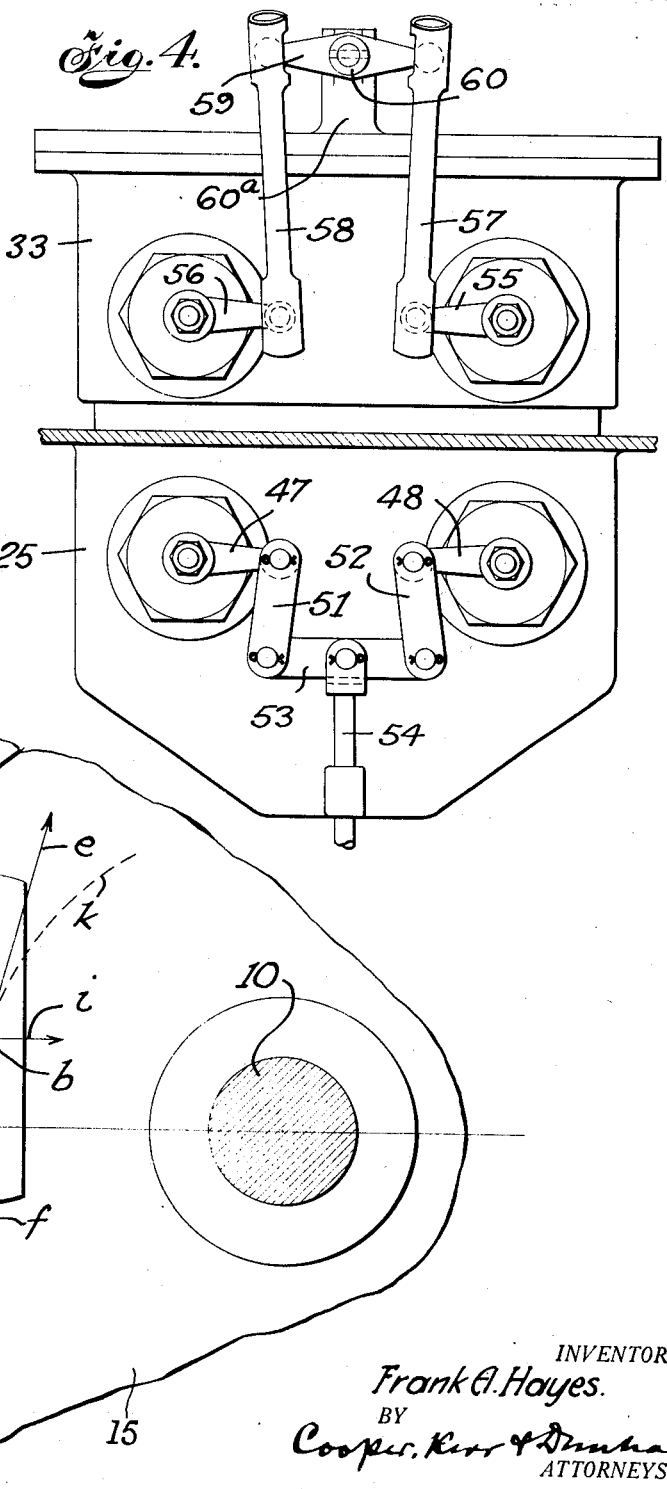
INVENTOR.
Frank A. Hayes.
BY
Cooper, Kerr & Dunham
ATTORNEYS.

Jan. 8, 1929.  1,698,229
F. A. HAYES
VARIABLE SPEED TRANSMISSION MECHANISM
Filed June 29, 1925    5 Sheets-Sheet 5
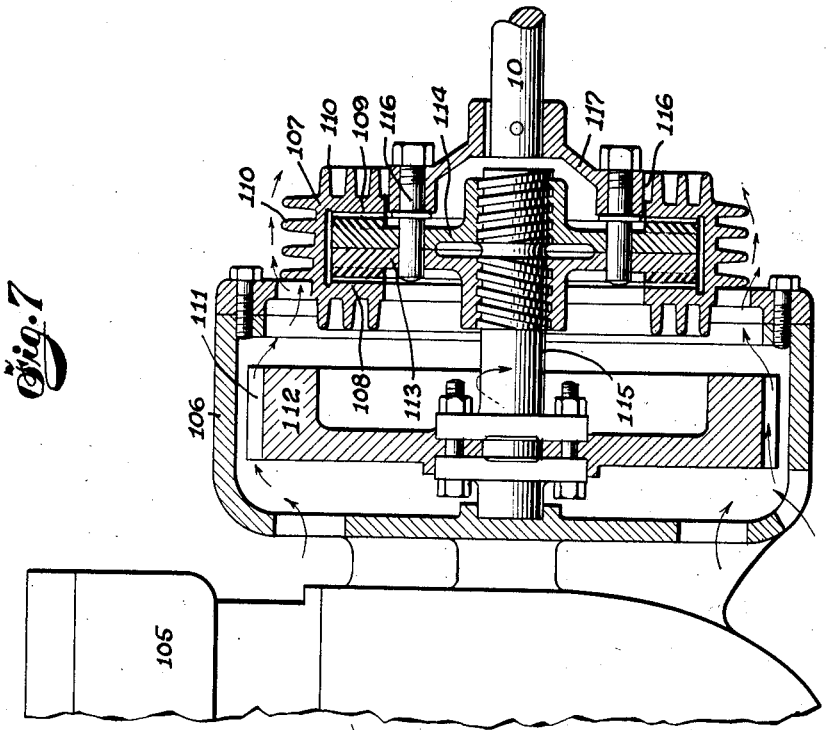
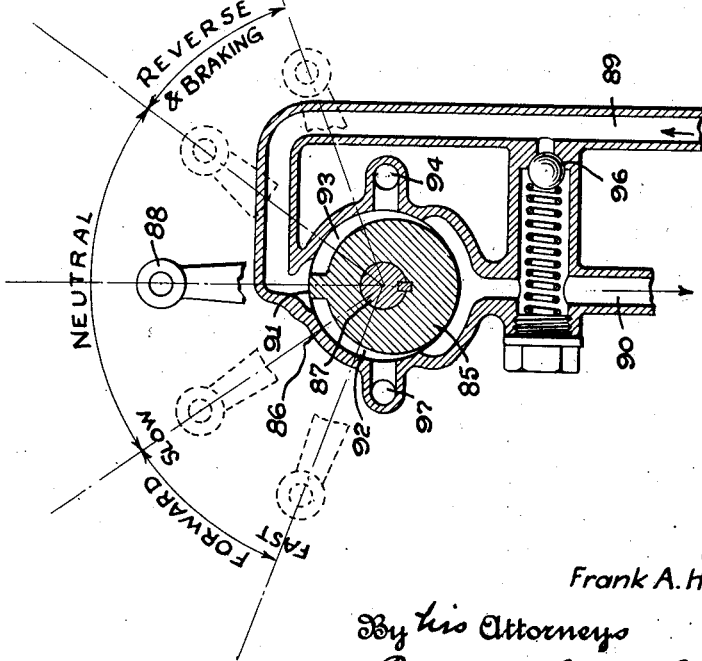
Inventor
Frank A. Hayes.
By his Attorneys
Cooper, Kerr & Dunham Patented Jan. 8, 1929.

1,698,229

UNITED STATES PATENT OFFICE.

FRANK A. HAYES, OF KEYPORT, NEW JERSEY.

VARIABLE-SPEED TRANSMISSION MECHANISM.

Application filed June 29, 1925. Serial No. 40,268.

This invention relates to variable speed power transmission mechanisms of the friction type, in which one rotating disk or element drives another on an axis at an angle to that of the first, the variation in speed ratio being effected by changing the position of the point of contact of the two elements so as to bring such point nearer to or farther from the axis of one of them. In the preferred form of the invention the necessary change of position of the point of contact can be made without relieving the pressure between the elements.

The invention includes certain novel arrangements of the disks and transmission wheels by which it is possible to obtain zero speed ratio, and even to reverse the direction of rotation of the driven element, without interrupting the operation of the driving means. The invention further includes means for producing the necessary driving pressure between the elements of the transmission mechanism, in correspondence with the torque or load on the mechanism, so that it is possible to proportion the actual contact pressures to the load requirements and thus relieve the transmission elements of heavy duty except at such times as it may be required. This is of special advantage in such service as is called for in motor vehicles, where the average power requirements are apt to be less than a fourth of the maximum.

The invention also includes the provision of automatic control of "speed" change, dependent upon the predetermined speed of the driving means, as for example the engine of an automobile, under the control of the operator, so that maximum speed ratio is automatically provided if the speed of the driving means exceeds the aforesaid predetermined value, but if such speed drops below this value, as may result from an overload, the speed ratio of the transmission mechanism automatically decreases, thereby relieving the driving means and maintaining it at approximately the predetermined speed.

A serious objection to certain forms of variable speed transmission mechanisms in the prior art, in which zero speed ratio can be obtained, is that they provide no means of limiting the torque which the transmission mechanism may develop. Since power is the product of torque and speed, it is evident that at zero speed ratio the torque is theoretically infinite, neglecting the losses in the mechanism. The present invention therefore includes means whereby the torque is limited to a predetermined maximum, thus protecting the transmission mechanism itself and all connecting driven devices from damage due to overloading, and in particular preventing slippage of the friction elements of the transmission mechanism, with the resulting damage to the surfaces, rapid wear, noise, etc.

The invention further includes the provision of automatic braking, limitation of the load on the transmission mechanism during braking, and the provision of an automatic brake for use in vehicles, hoists, etc., which is capable of acting in addition to the friction of the driving means.

To these and other ends the invention comprises the novel features of construction and combinations of elements hereinafter described.

In the preferred form of the invention three disks are employed, spaced apart axially and mounted on a common shaft, the two outer disks being connected to the shaft to rotate therewith but the middle disk being free to rotate on the shaft and also slide thereon. The three disks are provided with annular groves in their opposed faces, so that the three provide two annular spaces, the cross sections of which form opposed circular arcs on a common center. Mounted in these annular spaces and contacting with the adjacent disks are two sets of friction wheels, having their axes normally in a plane passing through (i. e., containing) the disk axis and having their centers at the centers of curvature of the aforesaid annular spaces; the transmission wheels being also supported in such manner that their axes are free to "precess": that is, each wheel with its supporting bearings can turn through a limited angle on an axis which is perpendicular to the plane containing the axis of the wheel itself. This is hereinafter designated the "axis of precession". The wheels are further capable of a slight displacement along the axis of precession, by means of which displacement the variation of speed ratio is effected, by the frictional forces involved as hereinafter explained.

The embodiment outlined above is illustrated in the accompanying drawings, in which:

Fig. 1 is a sectional plan view through the axis of the driving shaft, showing both sets of transmission wheels precessed to the maximum angle for forward drive, that is, for maximum speed-ratio forward.

Fig. 2 is a section on a plane corresponding to line 2—2 of Fig. 1, showing a convenient way of mounting the wheels in their carriers, mechanism for manually precessing the wheels, and mechanism for limiting the torque. In this figure the transmission wheels are shown in the zero speed ratio position.

Fig. 2$^a$ is a diagrammatic cross-sectional view on the same plane as Fig. 2, illustrating the action of the disks and friction wheels in their automatic change of speed ratio.

Fig. 3 is a side elevation of a transmission mechanism such as illustrated in Fig. 1, with part of the external housing broken away, showing means which may be provided for manual control of the precession of the transmission wheels.

Fig. 4 is a plan view of the parts shown in Fig. 3.

Fig. 5 is a cross section on a plane corresponding to the line 5—5 of Fig. 1 showing fluid-pressure actuated means for producing the displacement of the transmission wheels as necessary to cause automatic precession thereof and also for limiting the torque.

Fig. 6 illustrates, somewhat diagrammatically, a manual control valve for the fluid pressure means illustrated in Figs. 1 and 5.

Fig. 7 is a longitudinal section illustrating an automatic brake mechanism, so constructed and connected with the driving means, for example an internal combustion engine, as to be ineffective so long as the engine is driving the load, but becoming effective when the load begins to drive the engine.

The driving shaft 10, Fig. 1, itself driven by any suitable means, not shown, is journaled in the driven shaft 11 so as to be capable of rotation therein, and has on it a friction driving disk 12, provided with an annular groove 13 the surface of which is in cross section a circular arc, as indicated in the drawing. Disk 12 is loose on the shaft, that is, it is not pinned or otherwise fixed on the shaft, but it is compelled to rotate therewith by means described hereinafter. On the shaft 10, spaced axially from disk 12, is a friction transmission disk 14, loose on the shaft so as to be capable of rotating freely thereon, and capable of longitudinal or axial movement to accommodate itself to the friction transmission wheels hereafter described. The disk 14 has two grooves, 15, 16, one in each face and each exactly like groove 13 in the disk 12. Between disks 12 and 14 is a pair of friction driving wheels 17, 18, having short journals 19, 20, mounted in bearings 21, 22, which are carried by vertical carriers 23, 24, Fig. 2, themselves carried by the casing 25 and adapted to have a limited rotary movement on axes equidistant from the axis of the disks. These wheels 17, 18 are in frictional contact with the disks 12, 14, in the grooves 13, 15, and are capable of free rotation in their bearings 21, 22, but since their carriers 23, 24 are mounted in the stationary casing 25 they (the wheels 17, 18) cannot revolve around the shaft 10 and for that reason they may be conveniently termed the "fixed", "stationary", or non-planetary wheels to distinguish them from the second pair, presently described, which are capable of such revolution. These wheels 17, 18 have their axes normally in the same longitudinal plane passing through or containing the axis of the shaft 10. That is, the wheel axes are normally co-planar with the disk axis. The edges of the wheels are spherical in contour, preferably on a slightly smaller radius of curvature than the grooves 13, 15 so that the wheels and disks will have approximately " line contact" with each other, as will be readily understood.

From the foregoing it will be seen that when shaft 10 is rotating at an angular speed $N_1$, disk 14 will be driven at a speed $N_2$ such that $$\frac{N_2}{N_1} = \frac{R_1}{R_2} \quad \text{------(1)}$$

in which $R_1$ is the radius of contact of wheels 17, 19, on disk 12, that is, the distance of the points of contact of the wheels and disk from the axis of shaft 10, and $R_2$ is the radius of contact of the wheels on disk 14. It will be understood, of course, in the above Equation (1), that the axes of the wheels make equal angles with the axis of the shaft.

It will also be seen that as the carriers 23, 24 are rotated to increase the contact-radius $R_1$ and decrease the radius $R_2$ the speed-ratio $\frac{N_2}{N_1}$ increases progressively.

On the other end of shaft 10 is a disk 26, keyed thereto and having in its inner face an annular groove 27 facing groove 16 and matching the latter in all respects. A collar 28 limits the axial movement of disk 26 toward the end of the shaft. Since disks 12 and 26 both rotate with the same shaft they always have the same speed of rotation.

Between disks 14 and 26 (Fig. 1) is a pair of friction wheels 29, 30, exactly like the "stationary" or non-planetary pair 18, 19, mounted in carriers 31, 32, the axes of which are equidistant from the disk axis. These latter carriers are exactly similar to carriers 23, 24, in which wheels 17, 18 are mounted, except that carriers 31, 32 are mounted in a drum 33, rigidly connected to the driven shaft 11 and coaxial therewith. The wheels 29, 30, being capable of revolving around the disk-axis, are conveniently referred to as the "planetary" wheels.

It will now be seen that disk 26, rotating at speed $N_1$, tends to rotate disk 14 at a speed $N_2$ such that $$\frac{N_2}{N_1} = \frac{R_4}{R_3} \quad \text{(2)}$$

in which $R_4$ (Fig. 1) is the radius of contact of wheels 29, 30 on disk 26 and $R_3$ is the radius of contact on disk 14. If $R_1$ and $R_4$ are equal, Equations 1 and 2 are identical (in numerical value), but if $R_1$ is greater or less than $R_4$ it will be seen that disks 13 and 26 will tend to drive disk 14 at different speeds. This being impossible the net result is that the wheels 29, 30 must revolve around the shaft 10 to compensate for the difference (except in so far as slip may occur between the wheels and disks), thus rotating drum 33 and the driven shaft 11 at a speed which depends upon the speed of shaft 10, and the values of the radii of contact, $R_1, R_2, R_3, R_4$. Mathematical analysis shows that the speed ratio of shafts 10 and 11 is expressed by the following equation, in which $N_3$ is the speed of shaft 11:

$$\frac{N_3}{N_1} = \frac{R_4 - \frac{R_1}{R_2}R_3}{R_4 + R_3} \quad \text{(3)}$$

From the relation expressed by Equation 3 it will be seen that if $\frac{R_1}{R_2}R_3$ is less than $R_4$, the ratio $\frac{N_3}{N_1}$ will be positive, which means that the driven shaft 11 will rotate forwardly, i. e., in the same direction as the driving shaft 10. As $R_2$ increases, that is, as the speed of disk 14 decreases, the speed of the driven shaft increases. If $\frac{R_1}{R_2}R_3$ is equal to $R_4$, the ratio $\frac{N_3}{N_1}$ will be zero, which means that shaft 11 will remain stationary, regardless of the speed of shaft 10. At this speed ratio the wheel axes are perpendicular to the axis of the disks, or at such angles thereto that $R_2 = R_3$. It will also be seen that when $R_1 = R_2$ the speed ratio $\frac{N_2}{N_1} = 1$. On the other hand, if $\frac{R_1}{R_2}R_3$ is greater than $R_4$ the ratio $\frac{N_3}{N_1}$ is negative, which means that shaft 11 rotates in the opposite direction to shaft 10.

Speed changes can be made by varying the radii of contact of the wheels on the disks, that is, by rotating the wheel-carriers in their mountings. If wheels 17 and 18 are turned (by rotation of their carriers) to parallelism with shaft 10, $R_1$ and $R_2$ become equal and Equation 3 reduces to $$\frac{N_3}{N_1} = \frac{R_4 - R_3}{R_4 + R_3} \quad \text{(4)}$$

Hence we can, by setting wheels 17, 18 parallel to the shaft, and by varying the angle of wheels 29, 30, vary the forward speed of shaft 11 to zero and into reverse.

Similarly, if wheels 29, 30 are turned to make $R_3 = R_4$, Equation 3 reduces to $$\frac{N_3}{N_1} = \frac{1}{2}\left(1 - \frac{R_1}{R_2}\right) \quad \text{(5)}$$

We can then obtain full speed range by varying the angle of wheels 17, 18 to the shaft.

Hence we can by varying the inclination of either set of wheels, vary the forward speed of shaft 11 through zero speed into reverse. The widest speed-range is obtained when both sets of wheels, that is, both the "fixed" and the "planetary" wheels, can be rocked or precessed, and the narrowest range is obtained when only the fixed set can be rocked.

The axis about which a given wheel is rocked is perpendicular to the axis of the wheel itself, and may be conveniently termed the axis of precession, as stated above.

In my prior Patent No. 1,540,124, issued June 2, 1925, to which reference may be made for a complete explanation of the phenomenon, I have described a construction embodying a pair of laterally overlapping disks rotating on parallel axes with a transmission wheel between and in frictional contact with the disks, and have shown that if the wheel is free not only to rotate but also to move longitudinally and transversely of its axis, it will tend to move so as to shift its points of contact (with the two disks) relatively to the plane of the disk axes. In the construction just alluded to, in which the disks are not coaxial, the motion of the wheel has, in general, a component parallel to the plane of the disk axis as well as perpendicular thereto when the center of the wheel lies outside of said plane. That is to say, the wheel has, in general, a movement longitudinally of its axis. This axial component (which is zero when the center of the wheel is in the plane of the disk axes) is itself the resultant of two parallel components in the same direction, one produced by one disk and one by the other. In the present construction, however, with the two disks coaxial, the two components just referred to are opposite in direction when the wheel axis is not co-planar with the disk axis, thereby tending to rock or "precess" the wheel about an axis parallel to the planes of the disks, which axis I have termed the "axis of precession". Upon reflection it will be seen that this precession or rocking motion is the movement desired for changing the speed ratio of the disks. On the other hand, when the wheel axis and the disk axis are co-planar the aforesaid oppositely directed forces are zero and the wheel has no tendency to precess in either direction. The wheel is then in "equilibrium position". Also, if the wheel is free to pivot or rock on its axis of precession and also to move so as to move bodily in directions transverse to its own axis so as to shift its points of contact on the disk to either side of the axis of a plane containing the disks, the wheel (or wheels, if more than one is employed) will automatically take the position of "equilibrium" corresponding to the speed ratio of the two disks, and will follow all changes of speed without tangential slippage. This automatic action is highly important, since it not only enables speed changes to be made without tangential slippage and without relieving the contact-pressures between the wheel (or wheels) and the disks, but also makes it possible to provide actuating mechanism which depends upon speed or torque, as desired, and to provide springs or other yielding means to normally resist movement of the wheel but yielding under overload to prevent slippage or other damage to the parts.

Referring now to Fig. 2, the wheel carrier 23, split for convenience of assembly on the plane indicated by the line 34, is journaled on the axis of precession P—P in two sleeves 35, 36, fixed in the casing 25. The controlled shaft 37, threaded in the upper end of the carrier 23, has a ball thrust bearing 38, clamped on the shaft (at about its middle) by and between a sleeve 39 and shoulder 40 and yieldingly positioned in the sleeve 41 by the washers 42, 43, which are arranged on opposite sides of the flange 44 in the lower end of the sleeve and are urged toward the flange and thrust-bearing by the disk springs 45, 46, so that the thrust bearing is normally held in the plane of the flange 44, which has the same axial thickness as the bearing. On the outer end of the carrier-control shaft is an arm 47, by which the carrier can be rocked at will. It will be understood that carrier 24 is constructed and equipped exactly like the other, except that the threads on shaft 37 are left-hand and those on the other control shaft, 24ª, are right-hand. Shaft 24ª has a control arm 48, and for convenience the two control arms are arranged toward each other, as indicated in Fig. 2.

The action of the wheel (or carrier) control-shaft will now be readily understood.

In Fig. 2 the wheel axes are in a plane passing through the axis of the disks, i. e., in a plane containing the axis of the disks. Assume now that it is desired to obtain a higher speed ratio by causing the wheel 17 (for simplicity this wheel alone will be considered) to rock or precess on the axis of its carrier in a direction which will decrease the speed of the driven disk 14; that is, counterclockwise as seen from above, toward the position shown in Fig. 1, making $R_2$ greater than $R_1$. For this purpose arm 48 is turned counterclockwise. The threads on the control shaft 37 being left-hand, the movement of arm 47 and shaft 37 raises the wheel, say to the position shown in Fig. 2ª, in which the distance the wheel is moved is exaggerated for the sake of clearness. The point of contact between the wheel and driven disk 14 (which point is at the far end of the wheel-diameter represented by the point marked $b$) is then moving with an instantaneous velocity which may be represented in direction (though not necessarily in magnitude) by the arrow $c$, tangent to the circle $k$ concentric with the disk and passing through the point of contact. Similarly, the point of contact between the wheel and disk 12 (between the observer and Fig. 2ª and of course not shown in the figure) has an instantaneous velocity in the direction of arrow $e$, tangent to a circle (not shown) about the disk axis and parallel to and of the same radius as circle $k$. Since these circles are in planes perpendicular to the disk axis the velocities $c$ and $e$ are co-planar. Resolving $c$ into components $f$ and $h$, respectively perpendicular to and parallel with the wheel axis, the former ($f$) is, evidently, the instantaneous relative velocity of revolution of the point of contact and the wheel around the axis of the wheel, while $h$ is the instantaneous velocity of the point around the axis of the wheel carrier. Likewise, the corresponding components $g$ and $i$ of velocity $e$ represent the velocities between the wheel and disk 12 (not shown) around the axis of the wheel and around the axis of the carrier. Since components $h$ and $i$ are opposite in direction and at opposite ends of a diameter, the wheel and its carrier must rock on the axis of the latter; (that is, the points of contact, by reason of the obliquity of the velocities $c$ and $e$, move on the disks in spiral paths); and since in the assumed normal conditions the control shaft does not rock or move axially, the rocking of the carrier (counterclockwise as seen from above in Figs. 2 and 2ª) "unscrews" the carrier, so to speak, on the left-hand thread by which it is connected to the control shaft. The carrier therefore moves down, and the angle between velocities $c$—$e$ and $f$—$g$ decreases. At the same time the "precessional" velocities $h$ and $i$ also decrease, and become zero when the axis of the wheel is again co-planar with the disk axis, that is, when the wheel is in the plane $a$ containing the disk axis. Precession, or rocking of the wheel on the axis of the carrier, then ceases—which means that the forces tending to cause the wheel to precess are in equilibrium. Since the unscrewing of the carrier and its concurrent descent toward the equilibrium position cease when precession ceases, descent of the wheel also ceases when the latter position is reached. Moreover, since the upward movement of the wheel is produced by rocking the control shaft, and since the wheel must precess as long as its points of contact on the disks are above the plane $a$, and since it is precession that causes descent of the wheel, it will, upon reflection, be seen that the angle through which the wheel precesses (rocks on its carrier axis) depends upon the angle through which the arm 47 on the control shaft is rocked to raise the wheel, and that these angles are equal. In other words, the wheel follows the control arm exactly. The other wheel, 18, Fig. 2, acts in the same manner except that it is shifted below the axial plane $a$ (Fig. 2$^a$ and precesses clockwise as seen from above in Fig. 2. It will also be clear that if wheel 17 is moved from the position of Fig. 2 to a position below the plane $a$, Fig. 2$^a$, it will precess or rock clockwise, and wheel 18, if raised above the plane $a$ will precess counterclockwise, thereby increasing the speed of driven disk 14.

Referring again to Fig. 2, in which wheel 17 is driving disk 14 in the direction of the arrow (counterclockwise) and is itself being driven by disk 12, not shown, it will be clear that the wheel tends to roll down on disk 12 (rotating clockwise between the observer and the wheel) and that by reason of the torque reaction of the driven disk 14 the latter also tends to move the wheel down. In other words, the forces exerted on the wheel are downward. (Similarly, the forces acting on wheel 18 are upward.) Suppose, now, that with the wheel 17 in some position between those shown in Figs. 1 and 2 the control shaft 37 is rocked counterclockwise as before to increase the speed ratio of the mechanism but that the rocking movement is effected too suddenly, thereby putting an overload on the transmission mechanism. When this happens the lower springs, 45, will yield and thus may prevent the wheel from moving upwardly at all, all of the anguar movement of the arm 47 being translated into downward movement of the control shaft 37, in which case the wheel will simply remain in the equilibrium position and will not precess as long as the overload persists. If, however, the overload is relieved, the springs will expand, thereby raising the shaft and the wheel together, whereupon the wheel precesses to the new speed-ratio position (determined by the extent of rotation of the shaft by the arm 47) and, in doing so, screws itself down to the equilibrium position. Or the compression of the springs may not be enough to prevent all upward movement of the wheel, in which event the shaft will be moved down and the wheel up, each a less distance than would otherwise be the case, with the result that the wheel will precess more slowly to the new speed-ratio position. In short, any change in speed-ratio causes acceleration of the load, thereby in effect increasing the load, and the wheel then precesses at such a rate as will keep the total effective load proportional to the spring pressure. Similarly, if the driven shaft 11, Fig. 1, be held stationary, the wheel 17, urged downwardly by the forces exerted on it as described above, will compress the lower springs (the control shaft 37 and carrier 23 moving downwardly together) and the wheel will precess or rock toward the position of zero speed ratio. As it does so, the springs are compressed more and more (by the action of the screw thread) and the control shaft 37 is moved farther down. As the precession continues the wheel moves toward the equilibrium position, leaving the springs compressed and the shaft down, and at zero speed position (assuming that the prime mover has not stalled and that zero speed position has therefore been reached) the transmission mechanism as a whole exerts on the stationary shaft 11 the maximum torque for which the control springs were designed or regulated, since the compressed springs are tending to raise the wheel above the equilibrium position. Of course wheel 18 acts in the same way. The action described takes place regardless of the positions of the arms 47, 48, Fig. 2. If, now, with the springs compressed as described, the overload is relieved sufficiently to permit the shaft 11 to turn, the springs 45 will expand proportionately and thereby raise the control shaft 37 and wheel 17. As soon as the wheel rises above the equilibrium position it begins to precess toward a speed ratio higher than zero. As it does so the acceleraton thus imparted to the shaft 11 increases the total load, but so long as the increasing toal load is less (in effect) than the force exerted by the springs the precession will continue toward a higher speed ratio and may reach the ratio for which the arm 47 was set when the automatic decrease to zero ratio occurred; but if at any time in the precession toward higher ratio the total load exerted on the springs is in effect equal to the then existing tension of the springs the latter will cease to expand, whereupon the wheel will move down to equilibrium position.

In Figs. 3 and 4 I show one arrangement of linkage for operating the carrier arms. In these figures the arms 47, 48, controlling the precession of the "stationary" or non-planetary wheels 17, 18, Fig. 1, are connected by links 51, 52, to an equalizer 53, connected at its center to a sliding actuating rod 54. Arms 55, 56, controlling the precession of the "planetary" wheels 29, 30, Fig. 1, are connected by links 57, 58 to equalizer 59 on the upper end of lever 60 fulcrumed on lug 60$^a$ on the revolving drum 33. The lower end of this lever extends into a grooved non-rotating actuating collar 61 which can be shifted axially on the bearing sleeve 62, by means of the sliding rod 63, to rock the lever. Either set of wheels can be left in the position of zero speed ratio, and the other used to vary the speed, or both may be precessed. For example, in the latter case the planetary set may be left normally at 1:1 speed ratio position and the other (or fixed) set used until the operator desires to go beyond the speed range afforded by this setting. He then actuates the lever 60, causing precession of the planetary set in the direction of the desired speed.

Fig. 1 also shows a convenient method of producing the necessary frictional contact pressures automatically, and also proportionately to the load. Disk 12 is loose on shaft 10, and disk 65 is splined thereon. Between the two is a ball-cage 66 having balls 64 working in annular recesses (in the disks) which are formed with sloping or helical portions, as indicated by the dotted lines 12$^b$ and 12$^c$, 65$^b$ and 65$^c$. It will be understood that there is a like set of inclines for each ball. A light spring 66 of the washer type furnishes the initial contact pressure, urging disk 65 against the balls, the latter against disk 12, and this disk against the wheels 17, 18. When a load comes on shaft 11 the reaction through wheels 29, 30, disk 14 and wheels 17, 18, tends to drive disk 12 ahead of shaft 10 if shaft 11 is rotating in the forward direction, or to cause disk 12 to lag behind shaft 10 if shaft 11 is running in the reverse direction. The balls 41 then roll up the inclines 12$^c$ and 65$^c$, or 12$^b$ and 65$^b$, as the case may be, until the tangential reaction caused by the ball pressures on the inclines, multiplied by the radius of the ball recesses, equals the torque imposed on disk 12. The first effect, as the balls roll up the inclines, is to shift disk 65 leftwardly until the spring 66 is flattened against the nut 66$^a$, after which further movement of the balls urges disk 12 rightwardly and thereby increases the contact pressure thereof on wheels 17, 18, in proportion to the torque on disk 12. Since the balls cannot over-run the summits of the inclines disk 12 must rotate with disk 65 and shaft 10 as soon as the contact pressure is sufficient to prevent slip.

Referring now to Fig. 5, the split carrier 70 is screwed into a piston rod 71, clamped to a diaphragm 72 spanning the chamber 73 formed in or carried by the drum 30. (See also Fig. 1.) The carrier 70 is journaled at its lower end in a bearing 74.

If fluid under pressure is admitted to the top of the chamber 73, above diaphragm 72, through duct F, the diaphragm and carrier will be depressed, bringing the wheel 30 (shown in Fig. 5 in the zero speed position) below the axial plane, whereupon the wheel will precess in a counterlockwise direction as seen from above, which will cause the drum 33 and shaft 11, to which the drum is attached, to revolve in the forward direction as indicated by the arrow. The wheel will continue to precess, thus increasing the speed ratio until it reaches the limit of its precession, at which limit the speed rato is at the maximum; or until the load on the driven member (shaft 11) causes the upward frictional forces on the wheel to exceed the fluid pressure on the diaphragm, whereupon the wheel will rise to the central (normal) position. Here the precession will cease, and the speed ratio will remain constant so long as the fluid pressure on the piston and the upward forces on the wheel are unbalanced. Suppose now that an overload is placed on shaft 11, tending to bring it to a stop. The upward frictional forces then exceed the fluid pressure and the wheel therefore rises above the axial plane, whence it will precess in the opposite direction until a speed ratio is reached at which the load can be carried without slowing down the driving member. If the overload is great enough the precession in the lower speed direction will continue until the speed ratio becomes zero. At this ratio the shaft 11 becomes stationary, but the wheels will continue to exert on it a torque whose maximum valve depends upon the fluid pressure on the piston. On the other hand, if the fluid pressure is admitted to the underside of the diaphragm, through passage R, the wheel will be raised and will therefore precess clockwise toward a lower speed ratio, and with high enough pressure under the piston the precession will continue through zero speed ratio into "reverse". In further illustration of this effect, assume that the driven machine, as for example an automobile, is traveling at high speed and the driver desires to stop it. The power is shut off from the engine and the fluid pressure is diverted from the top of the diaphragm to the lower side thereof. Thereupon the transmission wheels precess, as last described, toward zero speed ratio, thus causing the vehicle to drive the engine, which now acts as a brake; or by means such as shown in Fig. 7, causing a brake to be applied to the driving shaft 10, Fig. 1. In either case the braking effect continues at a rate depending upon the fluid pressure used, under the full control of the operator, until the car is brought to rest. The fluid pressure employed may be provided by any suitable means, but preferably by a gear pump driven at the speed of the driving means, as for example the engine lubricating pump. Such a pump is indicated in Fig. 1, and comprises a gear 75, on pin 76, and a gear 77 in mesh with the first and keyed on the driving shaft 10. The two gears are enclosed by a cover 78, forming a pump chamber which is connected with the ducts R, F, in any suitable manner. Oil may be delivered to the pump from the bottom of the casing 79 by suitable connection therewith, not shown.

Fig. 6 shows a control valve for the fluid system, which may be mounted on the steering column (not shown) of an automobile or in any other convenient location. 85 is an eccentric plug rotatable in the valve casing 86 and for that purpose keyed on shaft 87, which is provided with an actuating lever 88 by which it can be rocked at will. Fluid from the high pressure side of the pump is delivered through duct 89 to the top of the valve casing. The plug 85 is shown in neutral position, in which fluid from duct 89 passes freely to the drain pipe 90 and thence back to the pump or other source of oil under pressure. Suppose now that lever 88 is moved leftwardly toward the position marked "Forward". This carries lug 91 to the left, cutting passage 92 off from the drain pipe 90 and causing all the fluid from pipe 89 to flow to the right of the plug; but as the rotation of the plug continues, its eccentric portion gradually restricts the communication between the right-hand passage 93 and drain pipe 90, thus giving a throttling effect which causes pressure to build up in supply pipe 89 and hence in passage 93 and duct 94, whence the fluid flows to the transmission casing 25, Fig. 1, thence by annular passage 95 to duct F and chamber 73, Fig. 5. If the valve plug 85 is thrown to the extreme left, completely closing the communication from pipe 89 to the drain 90, the adjustable relief valve 96 acts to open the drain at a predetermined maximum pressure and thus protects the transmission from excessive overload, by preventing further increase of pressure on top of the diaphragm 72, Fig. 5. The action of the valve on reverse and for braking is similar and will be readily understood, fluid passing at the left of the valve plug to passage 97, thence to casing 25, Fig. 1, and through annular passage 98 to duct R. In driving a motor vehicle the operator may set lever 88 at a position which will give maximum "high gear" torque at a desired speed, say 15 miles per hour. Coming to a hill too steep to take "in high" the load on the engine reduces its speed and with it the speed of the oil through the passage (more or less restricted by the position of the valve plug) between passage 93 and the drain pipe 90. The pressure of the oil is correspondingly reduced, varying approximately as the square of the velocity of flow. But this reduction of pressure on top of diaphragm 72, Fig. 5, causes automatic reduction of the speed ratio, as already explained, until the engine is able to handle the car on the given grade. The car goes up the hill at lower velocity, but at the top the engine speeds up and the transmission returns to the speed ratio predetermined by the setting of the control valve. Thus no attention is required of the operator, and except for braking he may drive over any kind of hilly country without readjusting the control valve. The great convenience and advantage of this automatic speed control will be apparent to anyone that has driven a car.

It is to be noted that when the wheels, for example wheels 29, 30, Fig. 1, have been precessed to the extreme position in either direction they should return to the axial plane (i. e., the central position), if thrust on the bearings, slippage, and wear are to be avoided. This desired return may be provided for by any suitable means, as for example the cam-groove 100 in the lower journal of the carrier 70, Fig. 5, and the pin 101, which is narrow enough to permit the longitudinal displacement of the carrier to produce the desired speed changes, but as the maximum displacement is approached the inclined cam surface of the slot at the approaching end thereof engages the pin and cams the carrier back to the central position, thus preventing further precession.

An automatic brake mechanism is shown in Fig. 7 capable of use with motor vehicles in general, but especially advantageous with variable speed transmissions of the type herein described. In this figure the internal combustion engine 105 is provided with a flywheel housing 106, on which is mounted an annular braking element 107 having inner opposed annular braking surfaces 108, 109. The braking element may be provided with heat-radiating ribs 110 and may be further cooled by means of fan blades 111 on the flywheel 112. Between the braking surfaces on the inside of the element 107 are two brake disks 113, 114, mounted by left and right hand screw threads on the engine crank shaft 115, and capable of axial movement toward and from each other but compelled to rotate together by the pins 116 carried by a spider 117 fixed on the shaft 10, which may be the shaft leading to the usual clutch or to the transmission mechanism. When the engine is driving the load on shaft 10, in the direction of the arrow applied to shaft 115, the action of the screw threads causes the disks 113 and 114 to come together, out of contact with the braking surfaces on the element 107; but as soon as the car (or, in general, the load on shaft 10) begins to overrun and therefore drive the shaft 115, the resistance of the engine to such drive causes the disks to separate and press against the braking surfaces 108, 109, thus applying a brake to the load in proportion as the engine power is decreased or as the driving action of the car on the engine is increased. If the engine power is increased enough to drive the load instead of being driven by the latter, the brake disks come together and relieve the braking effect, as will be readily understood.

It is to be understood that the invention is not limited to the construction herein specifically described but can be embodied in other forms without departure from its spirit.

I claim—

1. In a variable-speed transmission mechanism, in combination, a pair of coaxial disks, a friction wheel between said disks, having its edge in frictional contact therewith, a carrier for the wheel, mounted for rotation on an axis perpendicular to the axis of its wheel, and means for shifting the carrier in line with its own axis to cause force exerted on the wheel, by at least one of the disks, to rock the carrier on its own axis.

2. In a variable-speed transmission mechanism, in combination, a pair of coaxial disks having in their opposed faces annular grooves of circular cross-section, a friction wheel between said disks, having its edge in frictional contact with the surfaces of said grooves, a carrier for the wheel, mounted for rotation on an axis perpendicular to the axis of its wheel, and means for shifting said carrier longitudinally of its axis.

3. In a variable-speed transmission mechanism, in combination, a pair of coaxial disks having in their opposed faces annular grooves of circular cross-section, a friction wheel between said disks, having its edge in frictional contact with the surfaces of said grooves, a carrier for the wheel, mounted for rotation on an axis perpendicular to the axis of its wheel, a support for the carrier, rotatable about the axis of the disks, and means for causing force exerted on the wheel, by at least one of the disks, to precess the wheel.

4. In a variable-speed transmission mechanism, in combination, a pair of coaxial disks having in their opposed faces annular grooves of circular cross section, a plurality of friction wheels between said disks, arranged about the disk axis and having their edges in frictional contact with the surfaces of said grooves, and carriers for the wheels, each mounted for rotation on an axis perpendicular to the axis of its respective wheel, and means common to all said carriers to shift the same longitudinally of their axes.

5. In a variable-speed transmission mechanism, in combination, a pair of coaxial disks having in their opposed faces annular grooves of circular cross section, a friction wheel between said disks, and having its edge in frictional contact with the surfaces of said grooves, a carrier for the wheel, mounted for rotation on an axis perpendicular to the axis of its wheel, means for normally holding the carrier with the axis of the wheel in a plane of the disk axis, and means operable at will to shift the carrier longitudinally of its axis and thereby displace the wheel axis from said plane.

6. In a variable-speed transmission mechanism, in combination, a pair of coaxial disks having in their opposed faces annular grooves of circular cross section, a friction wheel between said disks, having its edge in frictional contact with the surfaces of said grooves, a carrier for the wheel, mounted for rotation on an axis perpendicular to the axis of its wheel, a support for the carrier, rotatable about the axis of the disks, and means for shifting the carrier longitudinally of its axis in said support.

7. In a variable-speed transmission mechanism, in combination, a shaft, a disk mounted on the shaft for rotation therewith and having in its face an annular groove of circular cross section, a second disk mounted on the shaft to rotate thereon and having in each face an annular groove of circular cross section, a wheel between said disks, having its edges in frictional contact with the surfaces of said grooves whereby to drive one disk from the other, a carrier for the wheel, a support for the carrier, a third disk mounted on the shaft for rotation therewith and having in its inner face an annular groove of circular cross section, a wheel between the second and third disks, having its edge in frictional contact with the surfaces of the annular grooves therein, a carrier for the last mentioned wheel, and a support for the last mentioned carrier, rotatable about the axis of said shaft.

8. In a variable-speed transmission mechanism, in combination, a shaft, a disk mounted on the shaft for rotation therewith and having in its face an annular groove of circular cross section, a second disk mounted on the shaft to rotate thereon and having in each face an annular groove of circular cross section, a wheel between said disks, having its edges in frictional contact with the surfaces of said grooves whereby to drive one disk from the other, a carrier for the wheel, a support for the carrier, a third disk mounted on the shaft for rotation therewith and having in its inner face an annular groove of circular cross section, a wheel between the second and third disks, having its edge in frictional contact with the surfaces of the annular grooves therein, a carrier for the last mentioned wheel, a support for the last mentioned carrier, rotatable about the axis of said shaft, and means for causing disk-forces to precess either wheel at will.

9. In a variable-speed transmission mechanism, in combination, a shaft, a disk mounted on the shaft for rotation therewith, a second disk mounted on the shaft to rotate thereon and having in its outer face an annular groove of circular cross section, a wheel between said disks, having its edges in frictional contact therewith to drive one disk from the other, a third disk mounted on the shaft for rotation therewith and having in its inner face an annular groove of circular cross section, a wheel between the second and third disks, having its edge in frictional contact with the surfaces of the annular grooves therein, a carrier for the last mentioned wheel, rotatable on an axis at an angle to the axis of its wheel, a support for the carrier, rotatable about the axis of the shaft, and means for varying the contact pressure between the disks and wheels as the load on the mechanism varies.

10. In a variable-speed transmission mechanism, in combination, a shaft, a disk mounted on the shaft for rotation therewith, a second disk mounted on the shaft to rotate thereon and having in its outer face an annular groove of circular cross section, a wheel between said disks, having its edges in frictional contact therewith to drive one disk from the other, a third disk mounted on the shaft for rotation therewith and having in its inner face an anular groove of circular cross section, a wheel between the second and third disks, having its edge in frictional contact with the surfaces of the annular grooves therein, a carrier for the last mentioned wheel rotatable on an axis at an angle to the axis of the wheel, a support for the last mentioned carrier, rotatable about the axis of said shaft, means for causing force exerted on the last mentioned wheel by at least one of the disks to rock the wheel and its carrier, said means serving also to keep the driving torque of the transmission below a predetermined maximum.

11. In a variable-speed transmission mechanism, in combination, a pair of friction disks, a friction wheel between said disks, having its edges in frictional contact therewith, said wheel being shiftable to vary its points of contact on the disks, automatic means for varying the contact pressure between the wheel and the disks in proportion to the load on the mechanism, and means acting automatically to limit the driving torque of the mechanism to a predetermined maximum.

12. In a variable-speed transmission mechanism, in combination, a pair of coaxial disks, a friction wheel between said disks, having its edge in frictional contact therewith, means for causing force exerted on the wheel, by at least one of the disks, to rock the wheel on an axis at an angle to its axis of rotation, and means acting automatically to vary the contact pressure between the wheel and the disks in proportion to the load on the mechanism.

13. In a variable speed transmission mechanism of the friction type, in combination, a pair of coaxial disks, friction wheels between the disks, in frictional contact therewith and each movable to shift its points of contact with both disks in directions transverse to its axis, and carriers for the wheels, each capable of rocking on an axis at an angle to the axis of its wheel.

14. In a variable speed transmission mechanism of the friction type, in combination, a pair of coaxial disks having in their opposed faces annular grooves of circular cross section, friction wheels between the disks and in contact with the surfaces of said grooves, and carriers for the wheels, movable to permit shifting of the points of contact of the wheels on both disks in directions perpendicular to planes containing the disk axis, and capable of rocking on axes disposed angularly to the axes of the respective wheels.

15. In a variable speed transmission mechanism of the friction type, in combination, a pair of coaxial disks, a friction wheel arranged between the disks and in frictional contact therewith, a support for the wheel, mounted to rock on an axis perpendicular to the axis of the wheel for rocking movement of the wheel on the first mentioned axis by frictional forces exerted by the disks to decrease the speed ratio of the mechanism, and means for limiting to a predetermined maximum the torque which the mechanism can transmit as the speed ratio is decreased.

16. In a variable speed transmission mechanism of the friction type, in combination, a pair of coaxial disks having in their opposed faces annular grooves of circular cross section, a friction wheel between the disks and in contact with the surfaces of said grooves, mounted to move bodily transversely of its own axis and to rock on an axis at an angle to its own axis, and yielding means opposing bodily transverse movement of its wheel to limit to a predetermined maximum the torque which the mechanism as a whole can transmit.

17. In a variable speed transmission mechanism of the friction type, in combination, a pair of coaxial disks having in their opposed faces annular grooves of circular cross section, friction wheels between the disks and in frictional contact with the surfaces of said grooves and each movable to shift its points of contact with both disks in directions transverse to its axis, carriers for the wheels, each mounted to rock on an axis at an angle to the axis of its wheel when said bodily movement occurs, and means yieldingly connected with the wheels and operable at will to cause such transverse bodily movement thereof.

18. In a variable speed transmission mechanism of the friction type, in combination, a pair of coaxial disks having annular grooves of circular cross section in their opposed faces, friction wheels between the disks and in frictional contact with the surfaces of said grooves, each movable to shift its points of contact with both disks in directions transverse to its axis and adapted to rock on an axis transverse to its axis to vary the speed ratio of the transmission mechanism, and torque-responsive means for controlling said bodily movement of the wheels to limit to a predetermined maximum the torque which the mechanism can transmit.

19. In a variable speed transmission mechanism of the friction type, in combination, a pair of coaxial disks having annular grooves of circular cross section in their opposed faces, friction wheels between the disks and in frictional contact with the surfaces of said grooves, each movable to shift its points of contact with both disks in directions transverse to its axis and adapted to precess to higher or lower speed ratio when such bodily movement occurs, means operable at will to produce such bodily movement of the wheels, and torque-responsive means to prevent or cause such bodily movement and consequent precession according to load conditions.

20. In a variable speed transmission mechanism of the friction type, in combination, a pair of coaxial disks having grooves of circular cross section in their opposed faces, friction wheels between the disks and in contact with the surfaces of said grooves, carriers for the wheels mounted to be shifted transversely of the axes of the respective wheels and to rock on axes at an angle to the axes of the respective wheels to vary the speed ratio of the transmission mechanism, and fluid-pressure means operable at will to shift said carriers.

21. In a variable speed transmision mechanism of the friction type, in combination, a pair of coaxial friction disks having annular grooves of circular cross section in their opposed faces, a friction wheel between the disks and in contact with the surfaces of said grooves, a carrier for the wheel mounted to be shifted in directions transverse to the axis of the wheel and to rock on an axis at an angle to the axis of the wheel to vary the speed ratio of the transmission mechanism, a fluid-pressure cylinder, fluid-pressure actuated means therein, associated with the carrier to shift the same in said transverse directions, and means operable at will to control the fluid-pressure in said cylinder.

22. In a variable speed transmission mechanism of the friction type, in combination, a pair of coaxial friction disks having annular grooves of circular cross section in their opposed faces, friction wheels between the disks, and in contact with the surfaces of said grooves, carriers for the wheels mounted to be shifted transversely of the axes of the respective wheels and to rock on axes at an angle to the axes of the respective wheels to vary the speed ratio of the transmission mechanism, and fluid-pressure means operable at will to shift said carriers and acting automatically to limit to a predetermined maximum the torque transmitted by the transmission mechanism.

23. In a variable speed transmission mechanism of the friction type, in combination, a pair of coaxial friction disks having annular grooves of circular cross section in their opposed faces, friction wheels between the disks and in contact with the surfaces of said grooves, carriers for the wheels mounted to be shifted transversely of the axes of the respective wheels and to rock on axes at an angle to the axes of the respective wheels to vary the speed ratio of the transmission mechanism, driving means for the transmission mechanism, fluid-pressure mechanism operable at will to shift said carriers, and means for supplying fluid to the fluid-pressure mechanism at a pressure dependent upon the speed of the driving means.

24. In a variable speed transmission mechanism of the friction type, in combination, a pair of coaxial friction disks having annular grooves of circular cross section in their opposed faces, a friction wheel between the disks and in contact with the surfaces of said grooves, a carrier for the wheel, mounted to be shifted in direction transverse to the axis of the wheel and to rock on an axis at an angle to the axis of the wheel to vary the speed ratio of the transmission mechanism, a fluid-pressure cylinder, fluid-pressure actuated means therein, associated with the carrier to shift the same in said transverse directions, and valve mechanism operable at will to control the fluid-pressure in said cylinder and having relief means for limiting to a predetermined maximum the torque which transmission mechanism can transmit.

25. In a variable speed transmission mechanism of the friction type, in combination, a pair of coaxial friction disks having annular grooves of circular cross section in their opposed faces, driving means connected to one of the disks to drive the same, a friction wheel between the disks and in contact with the surfaces of said grooves, a carrier for the wheel mounted to be shifted in directions transverse to the axis of the wheel and to rock on an axis at an angle to the axis of the wheel to vary the speed ratio of the transmission mechanism, a fluid-pressure cylinder, fluid-pressure actuated means therein associated with the carriers to shift the same in said transverse directions, means operable at will to control the fluid-pressure in said cylinder, and means for supplying fluid to the cylinder at a pressure dependent upon the speed of the driving means.

26. In a variable speed transmission mechanism of the friction type, in combination, a pair of coaxial friction disks having annular grooves of circular cross section in their opposed faces, driving means connected with one of the disks to drive the same, friction wheels between the disks and in contact with the surfaces of said grooves, carriers for the wheels mounted to be shifted in directions transverse to the axes of the respective wheels and to rock on axes at an angle to the axes of the respective wheels to vary the speed ratio of the transmission mechanism, fluid-pressure actuated mechanism to shift the carriers in said transverse directions, means for supplying fluid to the fluid-pressure mechanism at a pressure dependent upon the speed of the driving means, means operable at will to control the fluid pressure, and automatic means to limit the fluid pressure to a predetermined maximum.

27. In a variable speed transmission mechanism of the friction type, in combination, a pair of friction disks, frictional wheels between the disks, carriers for the friction wheels, mounted for movement to vary the speed ratio of the transmission mechanism, fluid-pressure means operable at will to move the carriers, means for supplying fluid to said fluid-pressure means, and automatic means for limiting the fluid-pressure to a predetermined maximum.

28. In a variable speed transmission mechanism of the friction type, in combination, a pair of friction disks, driving means for one of said disks, friction wheels between the disks, carriers for the friction wheels, mounted for movement to vary the speed ratio of the transmission mechanism, fluid-pressure means operable at will to move the carriers, means for supplying fluid to said fluid-pressure means at a pressure dependent upon the speed of the said driving means, and automatic means for limiting the fluid pressure to a predetermined maximum.

29. In a variable speed transmission mechanism of the friction type, in combination, a pair of coaxial friction disks, friction wheels between the disks, carriers for the wheels, a support for the carriers, rotatable about the disk axis and permitting movement of the carriers and wheels to vary the speed ratio of the transmission mechanism, fluid-pressure means operable at will to move the carriers, means for supplying fluid to said fluid-pressure means, and automatic means for limiting the fluid pressure to a predetermined maximum.

30. In a variable speed transmission mechanism of the friction type in combination, a pair of coaxial friction disks having annular grooves of circular cross section in their opposed faces, friction wheels between the disks and in contact with the surfaces of said grooves, carriers for the wheels, a support for the carriers rotatable about the disk axis and permitting the carriers to rock on axes perpendicular to the axes of the respective wheels and to be shifted transversely of the axes of the respective wheels, to vary the speed ratio of the transmission mechanism, and means operable at will to shift the carriers.

31. In a variable speed transmission mechanism of the friction type, in combination, a pair of coaxial friction disks having annular grooves of circular cross section in their opposed faces, friction wheels between the disks, mounted for bodily movement transversely of their axes of rotation and for precession on axes perpendicular to their axes of rotation to vary the speed ratio of the transmission mechanism, supporting means for said wheels, rotatable about the axis of the disks, a shaft connected with the said supporting means for rotation thereby, and means for producing said bodily movement of the wheels.

32. In a variable speed transmission mechanism of the friction type, in combination, a pair of coaxial friction disks having annular grooves of circular cross section in their opposed faces, means for driving one of the disks, friction wheels between the disks, mounted for movement to vary the speed ratio of the transmission mechanism, supporting means for said wheels, rotatable about the axis of the disks, a shaft connected with the said supporting means for rotation thereby, and automatic means for limiting to a predetermined maximum the torque transmitted to said shaft at the lowest speed ratio.

33. In a variable speed transmission mechanism of the friction type, in combination, a pair of coaxial friction disks having annular grooves of circular cross section in their opposed faces, friction wheels between the disks, carriers for the wheels, adapted for rocking movement on axes transverse to the axes of rotation of the respective wheels to vary the speed ratio of the transmission mechanism, supporting means for the carriers, rotatable about the axis of the disks, a shaft connected with the carrier supporting means for rotation thereby, and means for producing speed-ratio varying movement of the carriers at will and acting automatically to limit the torque transmitted to said shaft.

34. In a variable speed transmission mechanism of the friction type, in combination, a pair of coaxial friction disks having annular grooves of circular cross section in their opposed faces, friction wheels between the disks, mounted for rocking movement on axes perpendicular to their respective axes of rotation to vary the speed ratio of the transmission mechanism, supporting means for said wheels, rotatable about the axis of the disks, a shaft connected with the said supporting means for rotation thereby, and means operable at will for causing said rocking movement of the wheels.

35. In a variable speed transmission mechanism of the friction type, in combination, a pair of coaxial friction disks having annular grooves of circular cross section in their opposed faces, friction wheels between the disks, mounted for rocking movement on axes perpendicular to their respective axes of rotation to vary the speed ratio of the transmission mechanism, and supporting means for said wheels, rotatable about the axis of the disks.

36. In a variable speed transmission mechanism of the friction type, in combination, a pair of coaxial friction disks having annular grooves of circular cross section in their opposed faces, driving means for one of the disks, friction wheels between the disks mounted for movement transverse to their axes of rotation and for rocking movement on axes perpendicular to their respective axes of rotation to vary the speed ratio of the transmission mechanism, fluid-pressure actuated mechanism for causing said transverse movement of the wheels, and means for supplying fluid to said fluid-pressure actuated mechanism at a pressure dependent upon the speed of the driving means.

37. In a variable speed transmission mechanism of the friction type, in combination, a pair of coaxial friction disks having annular grooves of circular cross section in their opposed faces, friction wheels between the disks shiftably mounted to cause rocking movement on axes perpendicular to their respective axes of rotation to vary the speed ratio of the transmission mechanism, and fluid-pressure actuated mechanism for causing shifting movement of the wheels.

38. In a variable speed transmission mechanism of the friction type, in combination, a pair of friction disks, friction wheels between the disks, supporting means for the wheels permitting movement thereof to vary the speed of the transmission mechanism, fluid-pressure actuated mechanism for causing speed-varying movement of the wheels, and means for supplying fluid to said fluid-pressure actuated mechanism at a pressure dependent upon the speed of the driving means.

39. In a variable speed transmission mechanism of the friction type, in combination, a pair of coaxial friction disks, friction wheels between the disks mounted for movement to vary the speed of the transmission mechanism, and fluid-pressure actuated mechanism operable at will for causing speed-varying movement of the wheels.

In testimony whereof I hereto affix my signature.

FRANK A. HAYES.